Sept. 6, 1960 G. E. MITCHELL ET AL 2,952,008

RECORD ACTUATED TIMING AND CHECKING MEANS

Filed Dec. 26, 1957 4 Sheets-Sheet 1

INVENTORS: G. E. MITCHELL
C. W. ALLEN

BY John A. Hall

ATTORNEY

Sept. 6, 1960 G. E. MITCHELL ET AL 2,952,008

RECORD ACTUATED TIMING AND CHECKING MEANS

Filed Dec. 26, 1957 4 Sheets-Sheet 3

United States Patent Office 2,952,008

Patented Sept. 6, 1960

2,952,008

RECORD ACTUATED TIMING AND CHECKING MEANS

George E. Mitchell, Endicott, and Charles W. Allen, Poughkeepsie, N.Y., assignors to International Business Machines Corporation, New York, N.Y., a corporation of New York Filed Dec. 26, 1957, Ser. No. 705,246

8 Claims. (Cl. 340—174)

This invention relates to the recording of information on magnetic surfaces and particularly to means for reading information so recorded.

The object of the invention is to provide a method of recording and reading magnetic records whereby the record provides timing and checking information in addition to the usual data encompassed therein.

Where records are carried by conventional sized cards made of paper or plastic material coated with a magnetic surface it is necessary to have a simple means for reading the information therefrom. In order to facilitate such an operation, the magnetic card apparatus of the present invention provides means whereby the data on a card may be sensed and translated into a display on a bank of lamps, on a typewriter, on a punched card, on a Dick strip or on any other conventional device.

The nature of the record is magnetic and is a function of a surface having bistable magnetic properties, that is, a surface which when magnetized in a positive sense will retain such magnetization indefinitely or until it is thereafter magnetized in a negative sense, whereafter it will just as readily retain such reverse magnetization. A bit, constituting a signal, consists of a reversal of the magnetic state of the surface and consequently where a bit is shown hereinafter as a short vertical line, that is actually a representation of a change in the magnetic state. The direction in which the change is made, from positive to negative or from negative to positive is immaterial. In recording, the bit, when received by the recording circuit, causes the recording head to reverse its energization. In reading, the head and associated circuitry merely notes a change but is in no way responsive to the direction thereof.

In accordance with this invention, all data is recorded serially in two parallel tracks, known for convenience as the data track and the sync track. A binary 1 in one track is complemented by a binary 0 in the other and a binary 0 in one track is complemented by a binary 1 in the other. Thus, a binary 1 will always be found in each code place, either in one track or the other. Hence, by means of an OR circuit having two inputs, one from the circuitry controlled by each track, a continuous count of the code places may be had, and this count may be used to control the sequential switching of the data bits to temporary registering means, from which the assembled bits may later be transmitted to any desired receiving circuit. This arrangement also possesses the merits of a continuous checking means, for an AND circuit may straddle the same two inputs of the OR circuit and will function as an alarm when through some random error a bit is found in both tracks, or when a bit is missing from each. The output of such an AND circuit may be used in any conventional manner to report this error.

In accordance with one embodiment of the present invention, a 3 x 5 inch (conventional size) card of magnetic material is used, on which 500 digits may be recorded in ten double tracks each having sufficient space for 56 digits. At a bit density of 100 per inch and with sufficient allowances for margins, a total of 448 bits will provide a record of 56 digits or characters each expressed in a space sufficient for eight code places. Such a code will accommodate a six bit code, a redundancy bit and a reset or checking bit.

A pair of reading heads for simultaneously scanning the parallel tracks is provided and the rate at which the tracks pass beneath these heads or at which the heads traverse the tracks will provide the timing and the fact that a bit will always be reported either by one head or the other for each of the said (448) bit places will provide a counting and synchronizing means by which the sequential operations of the device may be controlled without resort to the usually highly complicated timing and synchronizing controls of a processing machine.

A feature of the invention is the use of two reading heads, one scanning one track and the other simultaneously scanning a companion and complementary track, whereby one or the other will detect an information item in each code place characterized by the use of an OR circuit having two inputs, one connected to each of said reading heads and having an output connected to a counting means.

A feature of the invention is the use of a coincidence circuit for sensing an error consisting of a bit concurrently found in each of two complementary tracks or a blank in both tracks and which will operate to bring in an alarm or to otherwise note the error.

Where, through some random error, an extra bit is recorded so that in the same code place a bit will be found in both the sync track and the data track, an output signal will be produced in the said AND circuit which will immediately report such error and by conventional means will bring in an alarm.

The control system used requires a double bit in the eighth place, and hence means is provided to prevent the report of an error upon the operation of the said AND circuit as this eighth place is scanned.

A feature of the invention resides in the displacement of this eighth place code when through some random error a bit is missing. In this case, since no bit will be reported from either the sync track or the data track, the output from the OR circuit will fail and hence the ring circuit driven step by step by the coded bits will fall out of step therewith so that the said eighth place double code will be reported on the seventh (or other) output of the ring circuit and thus operate the AND circuit to report an error.

A feature of the invention is thus the combination of an OR circuit astraddle the two tracks of a dual track recording for driving counting means forward step by step, an AND circuit astraddle said two tracks, synchronizing means controlled by said counting means for deleting an output from said AND circuit when said counting means is in proper synchronism with the record on said dual tracks and for producing an output from said AND circuit when said counting means falls out of synchronism with said record, and an alarm circuit activated by an output of said AND circuit passed by said synchronizing means.

In accordance with this feature, the coding of the information is in the form of eight place codes, the first seven places of which must have but a single bit in the two tracks, one in either the sync track or one in the data track, and the eighth place of which must have a double bit, one in each of the sync and data tracks. Two logic circuits are employed, an OR circuit astraddle both tracks in order to produce a series of counting pulses in each of the eight code places and an AND circuit also astraddle both tracks arranged to report a double bit in any one of the first seven code places and to be disabled in the eighth code place where such a double bit is definitely expected. Where an error in the form of an extra bit is encountered, the said AND circuit will operate to bring in an alarm. Where an error in the form of a missing bit is encountered in any one of the first seven code places, the OR circuit will fail to advance the count properly and hence a double bit will be advanced and will operate the AND circuit.

Other features will appear hereinafter.

The drawings consist of four sheets, having eight figures, as follows.

Figure 2:
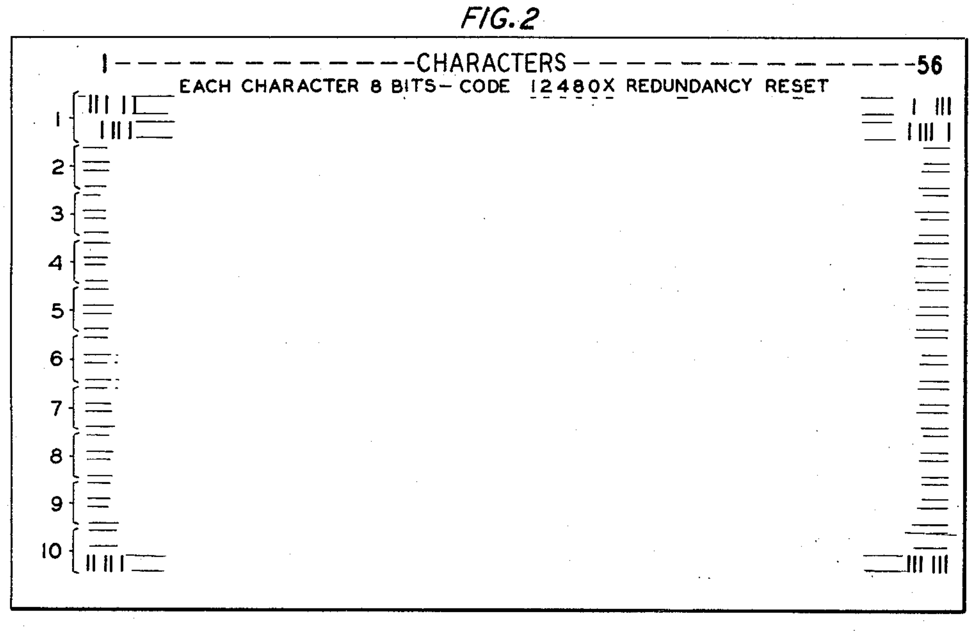
Fig. 2 is an enlarged representation of a 3 x 5 card showing how ten dual tracks of recording, each accommodating 56 characters, may be arranged.
Figure 7:
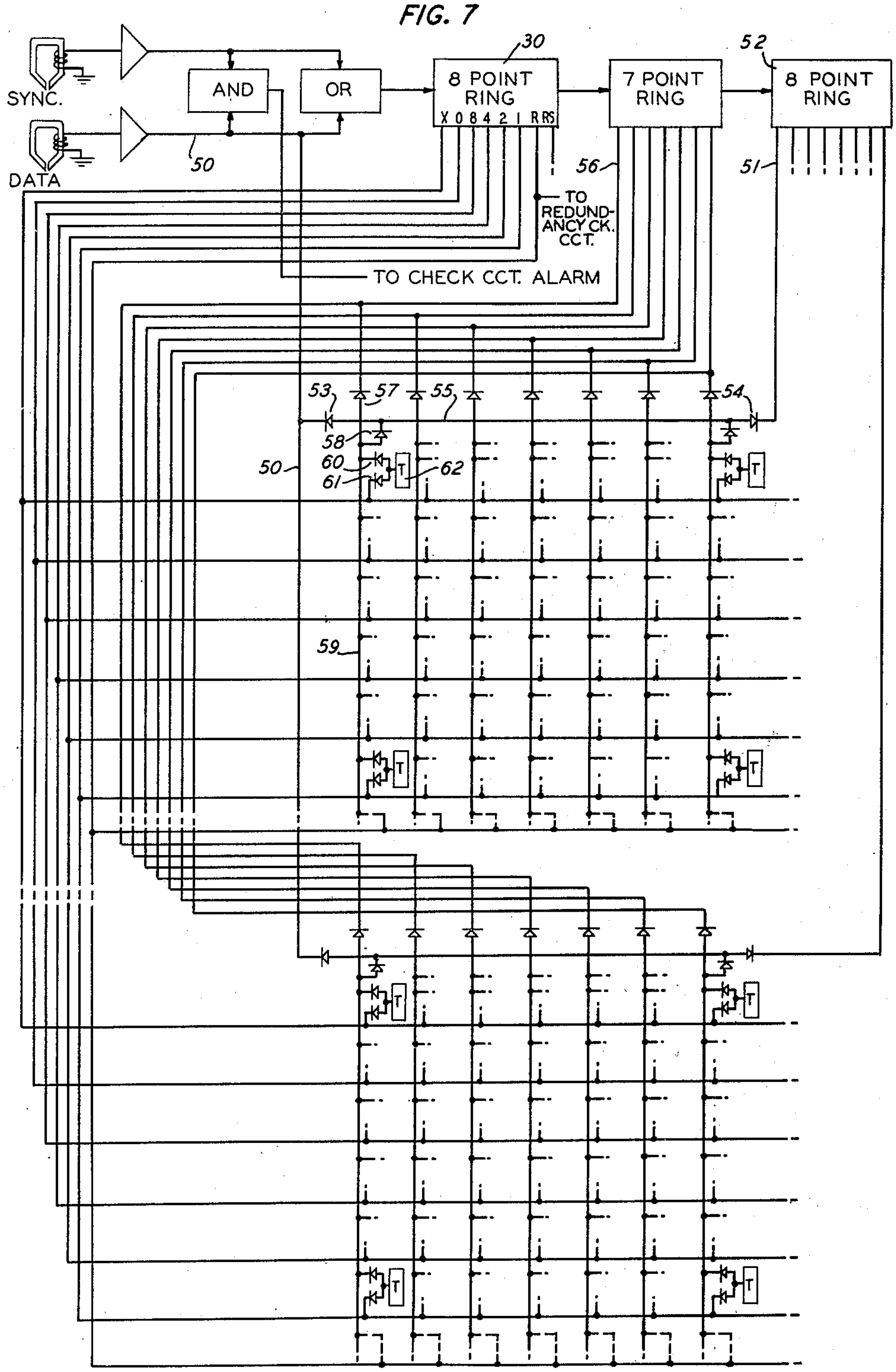
Figure 8:
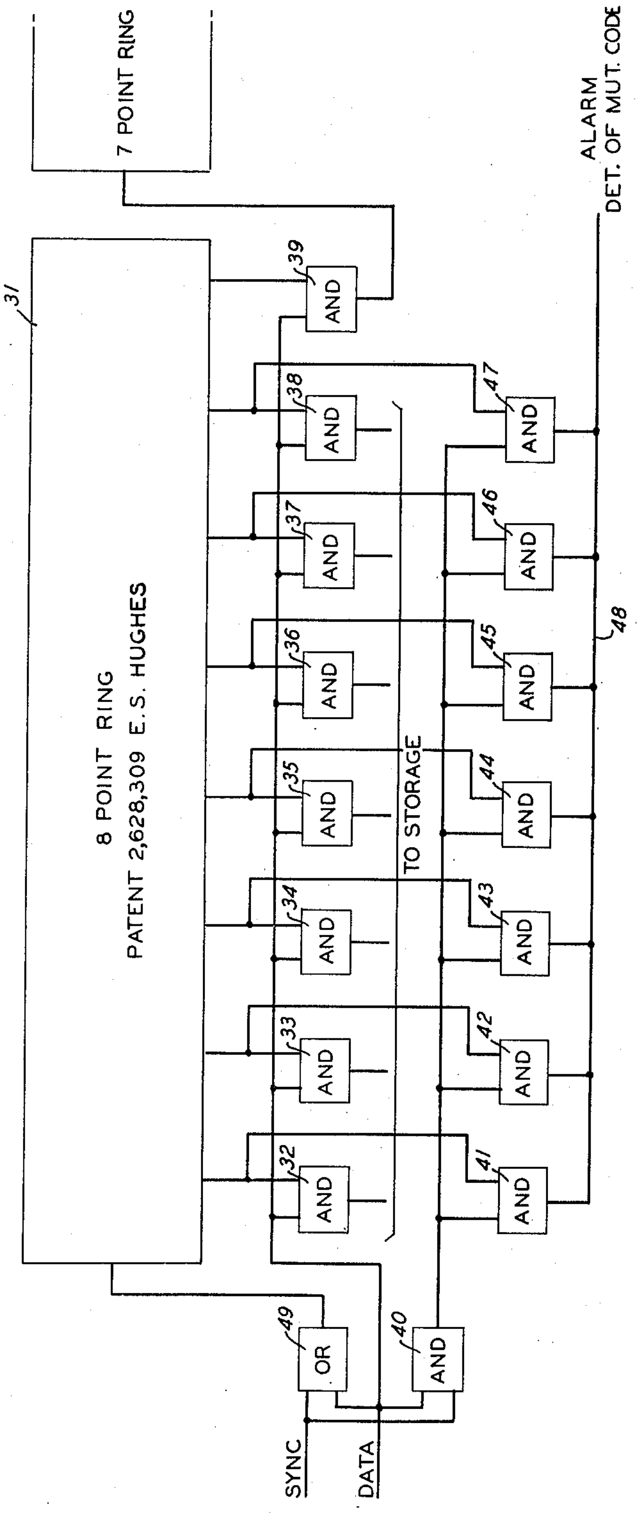

Fig. 7 is a schematic logical AND circuit diagram showing partly, and indicating how, 56 seven bit registers arranged in 8 groups of 7 each may be successively enabled to register the 56 characters in each of the dual tracks of the magnetic card of Fig. 2; and Fig. 8 is a logical and schematic circuit diagram showing an eight point ring circuit which may be operated step by step to successively enable the eight output circuits thereof for (1) distributing the seven bits of each incoming code to the proper storage circuit and for employing the eighth bit of such incoming code to advance a following seven point ring circuit and (2) for controlling the output of the AND circuit which straddles the sync and data track transducer outputs for the purpose of bringing in an alarm whenever more or less than a sufficient number of bits are recorded in those two tracks.

In order to have a clear understanding of the operation of the electronic scanning means of the present invention it will be helpful to have a general understanding of certain arrangements and certain terminology commonly used in the general field in which the present circuits are employed. Most of the components and the methods of operation are conventional.

A bit is a binary item, that is, a signal indicating a 1 in the binary code of 0 and 1. Where the signal represents one of the binary digits and the absence of a signal represents the other, this bit usually represents the binary digit 1 and in the data track this is true. However, in the sync track, which is complementary the bit represents the binary digit 0 so it must be said that in the composite record a binary 1 is represented by a bit in the data track and a binary 0 is represented by a bit in the sync track. The four consecutive binary orders, reading from right to lift, represent the decimal digits 1, 2, 4 and 8 and the sum of these values as represented by the bits expressed in any binary code equals the value of the decimal digit represented thereby. Where characters, such as letters of the alphabet, punctuation marks, and mathematical signs are also to be expressed, other bits herein represented by the letters X and O are also used along with the 1, 2, 4 and 8 bits and may be coded as set forth in the Whitney Patent 2,773,444. A bit is therefore a single binary item in a code which is used to express a given amount of information.

Up and Down refer to potentials. In the circuitry of the present invention, each component, such for instance as a tube circuit, is arranged to be active when the potential on its control conductor is Up and inactive when such potential is Down. Generally, as in a cathode follower circuit, when the potential on an input terminal is Up the potential on the output terminal is Up and likewise when the potential on an input terminal is Down the potential on the output terminal is Down. It may be stated, merely by way of example, that a potential of around plus 5 volts will constitute an Up condition and a potential of around minus 30 volts will constitute a Down condition. Up means that the voltage present at a particular point is positive with respect to ground and Down means that the voltage present is negative with respect to ground. If the control grid of a vacuum tube is referred to as Down, it means that the voltage at that control grid is below the cutoff value of the vacuum tube.

Numerous logic circuits are employed herein. An And circuit refers to a circuit which is operable to produce an Up condition on its output when all of its input terminals are Up. An OR circuit refers to a circuit operable to produce an Up condition on its output terminal when any one or another or more of its input terminals are Up.

In the logical diagrams included in the schematic circuit diagrams herein an AND circuit is shown or as a rectangle containing the designation AND, and an OR circuit likewise is shown as a rectangle containing the designation OR.

Other components such as cathode followers and triggers are conventional and are herein shortly described for reference purposes only. A cathode follower is a tube circuit having its anode firmly tied to a positive potential source or otherwise arranged so that the grid constitutes an input and the cathode or the cathode circuit constitutes an output. When the grid is Up, the cathode will go Up and when the grid goes Down the cathode will go Down. The cathode follower is primarily used as a current amplifier.

A trigger or a flip-flop is a conventional electronic bistable circuit, and as used herein is a storage device having one output normally Down. When an input signal arrives, the output is driven Up and this condition will be maintained until the trigger is restored. Triggers are shown and explained in detail in the said Palmer et al. Patent 2,658,681.

Figure 1:
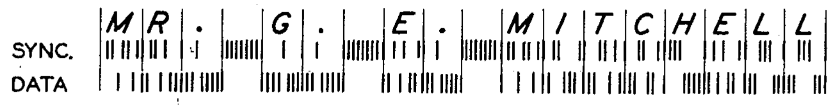
Fig. 1 is a greatly enlarged representation of a recorded dual track with the characters recorded in code groups of eight bits shown thereabove.

In the drawings, Fig. 1 is merely a representation of character coding where the dual track system is employed. In the manner fully explained in the Phelps Patent 2,774,646 the data is recorded in one track and a bit is recorded in the sync track for every missing bit in the data track. The code used is conventional seven place code providing room for six code bits and a redundancy bit, the six code bits being used to identify a character and the redundancy bit being used for checking purposes. Eight places are shown in the codes of Fig. 1, the eighth place invariably having a bit in both the sync track and the data track and acting again for checking and control purposes. It will thus appear that there will be one bit in each code place and a double bit (one in each track) in the eighth place. Thus the regular report of a bit in each place may, by the use of an OR circuit astraddle the two tracks, be used for counting purposes and the double bit, occurring regularly at a given place in the count may be used to note and report the loss of a bit in either the sync or the data track. In accordance with the present invention, an AND circuit also astraddle both tracks is used to note and report the erroneous occurrence of a bit in any one code place in both the sync track and the data track, with the exception of the eighth code place where other means is provided to insure that such a double bit is actually present.

Fig. 2 is an enlarged representation of a 3 x 5 card coated with or made of magnetic material used to show how some 560 characters may be recorded in 10 dual tracks each containing 56 eight bit codes or 448 code places. This is merely to give an idea of the amount of information that may be stored and to show a reasonable arrangement of apparatus and circuits that may be required to scan the card either track by track or all tracks simultaneously.

Figure 3:
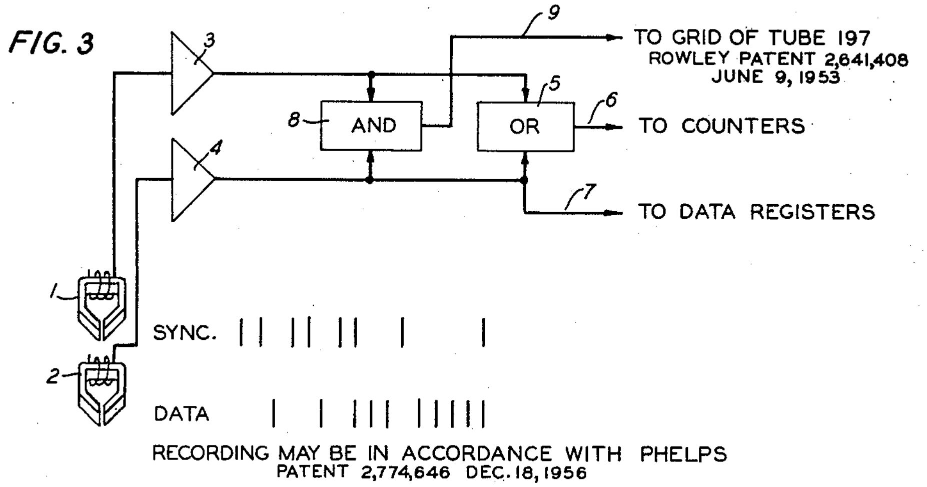
Fig. 3 is a fragmentary schematic circuit diagram showing how a pair of transducers may be used to scan the dual tracks of magnetic recording and how the output thereof may be used for registering purposes, for timing and counting purposes and for checking and alarm purposes.

Fig. 3 is a skeleton circuit arrangement showing the essential elements of the present invention. Two conventional transducers 1 and 2 are used to scan the sync and data tracks in which information is recorded. These are connected through amplifiers 3 and 4 respectively and both lead to an OR circuit 5, the output 6 of which leads to an array of counters which count the number of code places traversed by the transducers. The output of the amplifier 4 connected to the transducer 2 which scans the data track also has a connection 7 marked as leading to the data registers and which leads to any apparatus wherein the data may be usefully employed.

An outstanding feature of the present invention centers around the AND circuit 8 which is connected to the outputs of the two amplifiers 3 and 4 and which will produce a signal on its output 9 only when by coincidence a bit is reported as present in both the sync and data tracks, in which case this alarm or check signal functions to operate a check circuit such as that controlled by tube 197 of the Rowley Patent 2,641,408.

Figure 4:
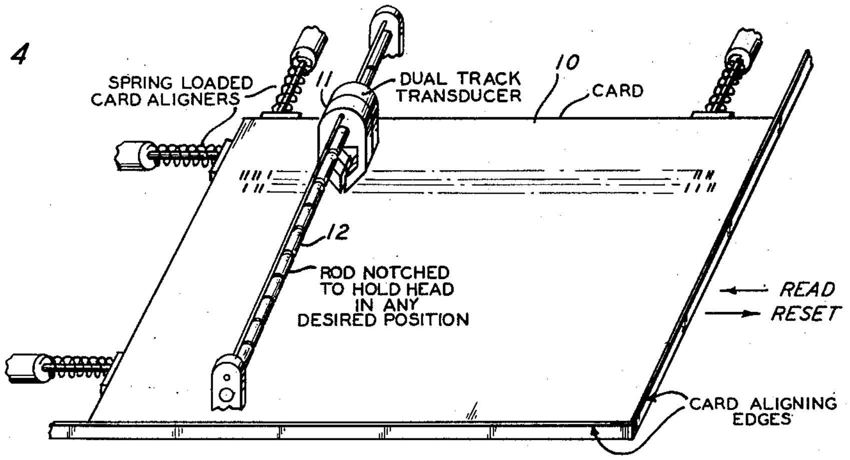
Fig. 4 is a perspective view of a pair of transducers mounted on a notched rod whereby the said transducers may be manually set in cooperative relationship with any given one of the dual tracks of a card and how the card may be fitted into a conventional card holder under the transducers whereby in its movement the record in a particular dual track may be sensed.

Fig. 4 is a perspective view of one simple arrangement which may be used for card sensing and scanning purposes. The card 10 may be placed against the aligning edges of a flat surface card holder and secured in place by a number of spring loaded card aligners. A dual track transducer 11 is mounted on a notched rod 12, whereby this transducer may be adjusted into cooperative relationship with any given track on a read movement of the card. The rate of movement of the card is not critical since the switching of the signals is controlled by ring circuits such as those fully set forth in the Hughes Patent 2,628,309 and which is controlled by these signals.

It will be understood that any type of means for repetitive access to the same record for in-line processing may be used, such as reciprocating card beds, drum type card holders, revolving heads with a semi-circular card bed, and continuous belt feeds. The simple reciprocating card bed shown in Fig. 4 will suffice to explain how any specified dual track may be observed at a time.

Figure 5:
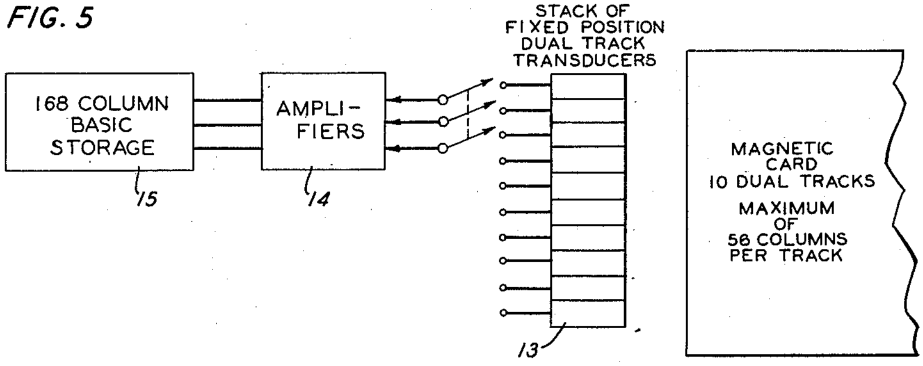
Fig. 5 is a schematic drawing showing how a stack of ten pairs of transducers may be arranged in cooperative relationship with the ten dual tracks of a magnetic card and how these transducers may be served with a smaller number of amplifiers working into a storage means.

It will also be obvious that a plurality of transducers may be mounted in cooperative relationship with the card so that all ten of the dual tracks may be scanned on each pass of the card, or as indicated in Fig. 5, a bank of ten transducers 13 may be mounted and then a lesser number may be selectively switched to amplifiers 14 and storage means 15.

Figure 6:
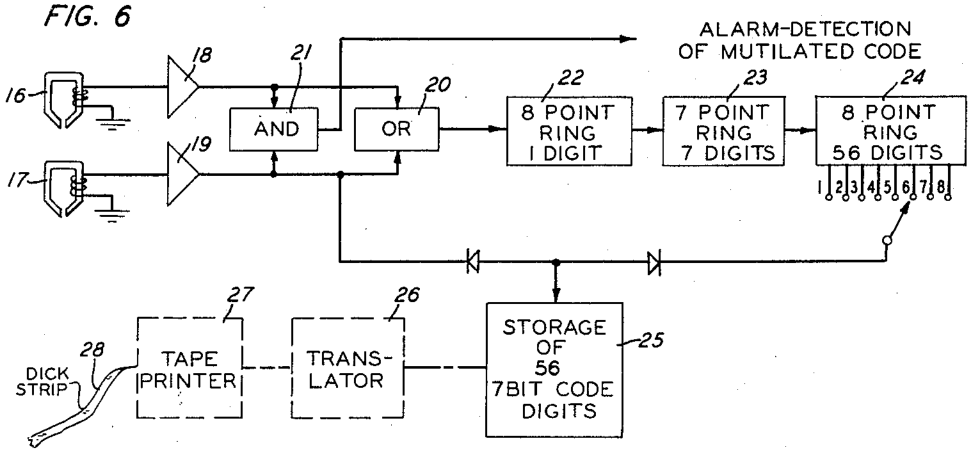
Fig. 6 is a schematic drawing showing how a particular small section of a line of recording in a given line may be scanned, translated and recorded on a tape by a printer.

Fig. 6 shows a complete schematic outline for scanning a selected dual track. The two transducers 16 and 17 feed through amplifiers 18 and 19 respectively and by means of the OR circuit 20 transmit a continuous stream of signals into the 8 point ring circuit 22. As indicated in Fig. 2, there will be 448 such signals in one pass of the card, that is, 56 characters each contained in an 8 bit code, and for purposes of registration as indicated in Fig. 7 these will be divided into 8 groups of 7 each by the rings 23 and 24 of Fig. 6 whereby the 56 characters contained in one dual track may be stored in the device 25 for observation in any conventional manner. As indicated in Fig. 6, these digits, stored in the circuitry of device 25 may be translated by the translator 26, transmitted to a tape printer 27 and recorded on a Dick strip 28 so that a record of the contents of any dual track of a card may be produced.

It will be understood that the first 8 point ring 22 of Fig. 6 will respond to the first group of coded bits constituting the first character as represented in Fig. 1, and that this ring 22 with its 8 output circuits will deliver the first seven coded bits to storage for translation and recording, the seventh or redundancy bit also to a proper checking circuit and the eighth will be used for checking and control purposes. It will be understood that during the transmission of these first seven signals the AND circuit 21 will be effective so that if a double bit (a bit in each of the two tracks) appears, a check circuit will be activated. It will further be understood that the eighth signal, which will definitely produce an output from the AND circuit 21 will be suppressed by the eighth output of the ring circuit 22, so that the alarm circuit cannot be triggered. Instead, this 8th signal will be used to advance the next in line 7 point ring circuit 23.

Fig. 8 shows schematically, in somewhat more detail, the operation of the ring circuit 22 of Fig. 6 and the operation of the same ring circuit 30 of Fig. 7. The ring circuit 31 of Fig. 8 is shown in great detail (as an 11 point ring) in the Patent 2,628,309 granted to E. S. Hughes. There will be eight outputs which will be successively driven Up and these may be used to successively switch the data line to the various storage circuits. Such eight point ring will successively switch the seven bits of each code to the proper place stores of a register (the seven actual place-stores indicated in Fig. 7) and will then use the eighth bit of the code to pulse the following 7 point ring. Thus in Fig. 8 the data line is connected to an input of each of the AND circuits 32 to 38 inclusive which are separately enabled in seriatim by the ring circuit 31. The outputs of these AND circuits lead to storage, as indicated in Fig. 7. The data line is also used as an input to the AND circuit 39 so that the eighth bit of the incoming code (the double bit) will function to advance the following 7 point ring.

It will be noted that the AND circuit 40 which straddles the circuit from the sync track and the circuit from the data track will also lead to inputs of AND circuits 41 to 47 which similarly are offered coincidence in seriatim by the 8 point ring so that if an extra bit appears through error in some code place a signal will be placed on the conductor 48 leading to a conventional alarm circuit. Since the eighth code place contains such a double bit, no AND circuit is provided to switch this definite output from the AND circuit to the conductor 48.

Now it is to be noted that if a bit should be missing in any code place, there will be no output from the OR circuit 49 and hence the 8 point ring will fall out of step with the incoming signals, as a result of which the eighth place double bit will get through the AND circuit 47 or some other of the AND circuits 41 to 47 depending on the number of missing bits. Therefore an alarm signal will be transmitted over the conductor 48. In a similar manner any extraneous signals appearing on either the sync or data line, or both, will result in a displacement such as to operate the alarm circuit. Thus the double bit eighth place signal in the regular serial transmission of code bits acts to bring in an alarm when displaced in serial order by either a missing or extraneous bit.

It is believed that a simple inspection of Fig. 7 will show the manner in which the information in any selected dual track of a magnetic card may be stored. The data will be present at all times on the conductor 50. At the start the conductor 51 of the last 8 point ring circuit 52 will be Up and since the two diodes 53 and 54 constitute an AND circuit, incoming bits will be switched to conductor 55.

In like manner, at the start, the conductor 56 of the 7 point ring will be Up and since diodes 57 and 58 constitute an AND circuit, an incoming bit over the conductor 55 will be switched to conductor 59.

Let us suppose that the first incoming bit, that marked X, in the 8 point ring 30 is present. Then the diodes 60 and 61 constituting an AND circuit and the conductor 59 being Up, such X incoming code bit will be switched into and registered in the trigger 62.

Thus 56 characters may be registered in one pass of a pair of transducers over a dual track, and as is indicated in Fig. 6 may be translated and displayed in any desired manner.

It may be noted that the error which is passed at high speed will nevertheless become apparent by the abrupt ending of the typed matter, for such an error will be detected before printing and the printing will be suppressed so that the location of such an error will be clearly indicated.

What is claimed is:

1. Means for scanning items of information recorded serially in code in a pair of parallel tracks, the record in each said track of each said pair being the complement of the other, each said item of information being expressed in a plurality of code places having a bit in either one or the other of said tracks in each of said code places, corresponding code places of each said tracks being scanned simultaneously, an OR circuit responsive to a bit in either of said tracks, and counting means responsive to said OR circuit.

2. Means of the type utilizing timing pulses in its operation comprising first and second scanning means for scanning items of information serially recorded in a pair of parallel tracks in which the code in one of said tracks is the complement of the code in the other of said tracks, said first scanning means positioned to scan one of said tracks and the second scanning means positioned to simultaneously scan the other of said tracks, an OR circuit adapted to receive signals from said first and said second scanning means for producing timing pulses, an AND circuit adapted to receive signals from said first and said second scanning means for producing error indications, means connected to said OR circuit utilizing said timing pulses and alarm means connected to said AND circuit.

3. Means for scanning items of information recorded in code in a pair of parallel tracks, each said item of information being expressed in a plurality of code places having a bit in either one or the other of said tracks in each of said code places excepting the last one thereof and a bit in each of said tracks in said last code place, an OR circuit responsive to a bit in either of said tracks for counting said code places, an AND circuit responsive to the coincident appearance of a bit in each of said tracks, a counter responsive to said OR circuit, means controlled by said counter for switching the output of said AND circuit to an alarm circuit on all of said code places counted excepting the last thereof, whereby an alarm is produced responsive to an error in said tracks consisting of an additional bit in any of said first plurality of code places or alternatively responsive to an error in said tracks consisting of a missing bit in any of said first plurality of code places.

4. Means for scanning items of information recorded serially in code in a pair of tracks in which each information item character is expressed in a code having $n$ code places and in which there is but a single bit in said two tracks in each of $n-1$ code places and a double bit consisting of a bit in each of said tracks in one code place, means for sensing said bits in each said track, an OR circuit astraddle the outputs of said two sensing means, a step by step counting means responsive to said OR circuit, an AND circuit in parallel with said OR circuit and responsive to a said double bit, an alarm circuit, and means controlled by said step by step means for switching the output of said AND circuit to said alarm circuit on $n-1$ steps thereof corresponding to the said $n-1$ code places normally containing but a single bit in the two said tracks, whereby said alarm circuit will be operated from said AND circuit in the event that through random error an extra bit is included in any one of said $n-1$ code places or alternatively in the event that through random error a bit is missing in any one of said $n-1$ code places.

5. Means of the type utilizing timing pulses in its operation comprising first and second scanning means for scanning items of information serially recorded in a pair of parallel tracks in which the code in one of said tracks is the complement of the code in the other of said tracks and in which each code comprises a maximum of $n$ signals, said first scanning means positioned to scan one of said tracks and the second scanning means positioned to simultaneously scan the other of said tracks, an OR circuit adapted to receive signals from said first and said second scanning means for producing timing pulses, an AND circuit adapted to receive signals from said first and said second scanning means for producing error indications, a counter responsive to said OR circuit, said counter having $n$ outputs corresponding to $n$ signals in each code, an error reporting AND circuit connected to each of $n-1$ of said outputs whereby said OR circuit enables said counter to successively energize one input of each said error reporting AND circuit, said first AND circuit having an output connected to an input of each said error reporting AND circuit and means connected to the output of each said error reporting AND circuit for operating alarm means.

6. Means of the type utilizing timing pulses in its operation comprising first and second scanning means for scanning items of information serially recorded in a pair of parallel tracks in which the code in one of said tracks is the complement of the code in the other of said tracks and in which each code comprises a maximum of $n$ signals, the first $n-1$ of which consists of a signal in either one or the other of said tracks and the last of which consists of a signal in both said tracks, said first scanning means positioned to scan one of said tracks and the second scanning means positioned to simultaneously scan the other of said tracks, an OR circuit adapted to receive signals from said first and said second scanning means for producing timing pulses, an AND circuit adapted to receive signals from said first and said second scanning means for producing signals indicating an error if included in said first $n-1$ signals and a normal operation if included in said last signal, a counter responsive to said OR circuit, said counter having $n-1$ outputs and means for successively transmitting a signal over each of said outputs, an error reporting AND circuit having an individual input connected to each of said $n-1$ counter outputs and a common input connected to the output of said first AND circuit whereby an erroneous pair of signals consisting of one in each of said tracks occurring in place of one of said first $n-1$ signals will immediately operate one of said error reporting AND circuits.

7. Means of the type utilizing timing pulses in its operation comprising first and second scanning means for scanning items of information serially recorded in a pair of parallel tracks in which the code in one of said tracks is the complement of the code in the other of said tracks and in which each code comprises a maximum of $n$ signals, the first $n-1$ of which consists of a signal in either one or the other of said tracks and the last of which consists of a signal in both said tracks, said first scanning means positioned to scan one of said tracks and the second scanning means positioned to simultaneously scan the other of said tracks, and OR circuit adapted to receive signals from said first and said second scanning means for producing timing pulses, and AND circuit adapted to receive signals from said first and said second scanning means for producing signals indicating an error if included among said first $n-1$ signals and a normal operation if included in said last signal, a ring counter continuously and regularly responsive to said OR circuit, said counter having $n$ outputs and means for successively transmitting a signal over each of said outputs, an error reporting AND circuit having an individual input connected to each of $n-1$ of said ring counter outputs and another input connected in common to the output of said first AND circuit whereby an output signal from said first AND circuit occurring during the transmission of a signal over any one of said $n-1$ counter outputs will operate a corresponding one of said $n-1$ error reporting AND circuits.

8. Means for scanning items of information serially recorded in a pair of parallel tracks in which the code in one of said tracks is the complement of the code in the other of said tracks, a code consisting of a given number of places having a bit in one or the other of said tracks in each said place and a bit in both said tracks in the last of said places, said means consisting of a pair of detector heads one for each of said tracks, means for causing relative movement between said tracks and said heads whereby said heads effectively traverse said tracks concurrently so as to scan corresponding code places simultaneously, an OR circuit having inputs connected to the outputs of said heads and having an output connected to means for counting the number of code places traversed by said heads, an output of one of said heads for reporting the codes detected, an AND circuit connected to the outputs of said heads for reporting the simultaneous detection of a bit in each of said tracks, an alarm means and means jointly controlled by said AND circuit and said counter for enabling said alarm means, said jointly controlled means being provided for each of said code places excepting the said last one thereof.

References Cited in the file of this patent

UNITED STATES PATENTS

| | | |
|---|---|---|
| 2,512,038 | Potts | June 20, 1950 |
| 2,609,143 | Stibitz | Sept. 2, 1952 |
| 2,628,346 | Burkhart | Feb. 10, 1953 |
| 2,760,063 | Andrews | Aug. 21, 1956 |
| 2,764,463 | Lubkin et al. | Sept. 25, 1956 |
| 2,782,398 | West et al. | Feb. 19, 1957 |
| 2,793,344 | Reynolds | May 21, 1957 |
| 2,813,259 | Burkhart | Nov. 12, 1957 |
| 2,864,077 | De Turk | Dec. 9, 1958 |
| 2,898,578 | Steele | Aug. 4, 1959 |